(12) United States Patent
James

(10) Patent No.: US 10,965,390 B2
(45) Date of Patent: Mar. 30, 2021

(54) RECEIVER APPARATUS AND METHOD FOR CONTROLLING THE ACCESS TO CONTENTS BROADCASTED VIA SATELLITE

(71) Applicant: Saronikos Trading and Services, Unipessoal LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 163 days.

(21) Appl. No.: 15/736,249

(22) PCT Filed: Jun. 15, 2015

(86) PCT No.: PCT/EP2015/063371
§ 371 (c)(1),
(2) Date: Dec. 13, 2017

(87) PCT Pub. No.: WO2016/202361
PCT Pub. Date: Dec. 22, 2016

(65) Prior Publication Data
US 2018/0198542 A1   Jul. 12, 2018

(51) Int. Cl.
*H04H 60/15* (2008.01)
*H04H 60/43* (2008.01)
(Continued)

(52) U.S. Cl.
CPC .............. *H04H 60/15* (2013.01); *H04B 7/005* (2013.01); *H04H 40/90* (2013.01); *H04H 60/13* (2013.01);
(Continued)

(58) Field of Classification Search
CPC ......... H04H 60/15; H04H 60/13; H04H 60/43
(Continued)

(56) References Cited

U.S. PATENT DOCUMENTS

| 2002/0154777 | A1 | 10/2002 | Candelore |
| 2007/0070978 | A1* | 3/2007 | Bell ........................ G06F 21/10 370/352 |

(Continued)

FOREIGN PATENT DOCUMENTS

| EP | 2 227 006 A1 | 9/2010 |
| WO | 2005/041064 A1 | 5/2005 |
| WO | 2011/011854 A1 | 2/2011 |

OTHER PUBLICATIONS

International Search Report and Written Opinion dated Feb. 15, 2016, issued in PCT Application No. PCT/EP2015/063371, filed Jun. 15, 2015.

*Primary Examiner* — John B King
*Assistant Examiner* — Angela R Holmes
(74) *Attorney, Agent, or Firm* — Workman Nydegger

(57) ABSTRACT

A receiver apparatus and a method for controlling the access to at least a portion of a content broadcasted via satellite, wherein the receiver apparatus includes a receiver for receiving broadcast signals configured for receiving at least a broadcast signal having at least a content, a receiver for receiving terrestrial signals configured for receiving at least a terrestrial signal, and a processor configured for determining access information on the basis of at least the received terrestrial signal, and allowing or blocking, on the basis of at least the access information, the access to the at least one content of the broadcast signal.

5 Claims, 4 Drawing Sheets

(51) Int. Cl.
- *H04H 60/51* (2008.01)
- *H04N 21/426* (2011.01)
- *H04N 21/61* (2011.01)
- *H04N 21/4405* (2011.01)
- *H04N 21/266* (2011.01)
- *H04H 60/14* (2008.01)
- *H04N 21/45* (2011.01)
- *H04N 21/454* (2011.01)
- *H04H 40/90* (2008.01)
- *H04B 7/005* (2006.01)
- *H04H 60/13* (2008.01)
- *H04H 60/91* (2008.01)
- *H04H 60/94* (2008.01)

(52) U.S. Cl.
CPC ............ *H04H 60/14* (2013.01); *H04H 60/43* (2013.01); *H04H 60/51* (2013.01); *H04H 60/91* (2013.01); *H04N 21/26613* (2013.01); *H04N 21/4263* (2013.01); *H04N 21/4405* (2013.01); *H04N 21/44055* (2013.01); *H04N 21/454* (2013.01); *H04N 21/4524* (2013.01); *H04N 21/6162* (2013.01); *H04N 21/6193* (2013.01); *H04H 60/94* (2013.01); *H04H 2201/60* (2013.01)

(58) Field of Classification Search
USPC .......................................................... 726/4
See application file for complete search history.

(56) References Cited

U.S. PATENT DOCUMENTS

| | | |
|---|---|---|
| 2008/0222705 A1 | 9/2008 | Goodmon et al. |
| 2009/0174600 A1* | 7/2009 | Mazlum ................. G01S 19/50 |
| | | 342/357.58 |
| 2014/0229974 A1* | 8/2014 | Koyama ............ H04N 21/4347 |
| | | 725/31 |
| 2016/0021401 A1* | 1/2016 | LaBosco ............ H04N 21/4367 |
| | | 725/31 |

* cited by examiner

RECEIVER APPARATUS AND METHOD FOR CONTROLLING THE ACCESS TO CONTENTS BROADCASTED VIA SATELLITE

BACKGROUND OF THE INVENTION

1. The Field of the Invention

The present invention refers to a receiver apparatus and a method for controlling the access to at least a portion of a content broadcasted via satellite and received by said receiver apparatus in order to allow or block, on the basis of the position of said receiver, the access to said portion of the content broadcasted via satellite.

2. The Relevant Technology

In the following description it will be clear that by receiver apparatus of television signals it is meant a television equipped with its own screen, or a terrestrial type Set Top Box, able to receive and display television programs, in the latter case using for viewing an external screen of a monitor or a television, or a television/radio USB receiver for portable computers, or a personal computer card that can receive and decode the broadcast signal. Similarly by receiver apparatus of radio broadcast signals it is meant any type of radio that is incorporated with other equipment or of the stand-alone type.

The method used by said television and/or radio signals receiver to implement the new features described below in the present description are also part of the invention.

As is known, many television and/or radio stations transmit contents via satellite. This happens because satellite transmissions require less resources than terrestrial ones: transmitting via satellite makes possible to simplify the content distribution network of a broadcaster, since said broadcaster can reach a large number of receivers by simply transmitting, its broadcast signal directly or through a satellite provider, instead of using a complex terrestrial repeater network or the like.

In this way, the broadcast signals of all the broadcasters using a satellite distribution system are spread over a very large geographical area (also identified by the term 'satellite footprint') that typically comprises more than one country.

This aspect may be problematic for the broadcasters who can transmit contents only within one or more specific countries; indeed, the distribution contracts between the broadcasters and the production companies of the television/radio contents very often specify the country in which the broadcaster can transmit a particular contents (e.g., a television series, a movie, etc.).

For solving this problems, a satellite broadcaster can encrypt its signal through an encryption system like VideoGuard®, Nagravision® or the like; by using one of these systems, the satellite broadcaster has to provide to each of its customers at least a proper decoding apparatus (typically a set-top-box with a conditional access module using a smartcard reader). This solution is widely used for pay-TV, but it can be problematic for small broadcasters because it requires to set up a commercial network for selling and/or servicing the decoding apparatuses and/or the smartcards.

Alternatively, a broadcaster can join with another broadcaster or becomes partner of a distribution platform which provides encrypting services. This solution requires that the conditions in the distribution contracts subscribed by said broadcaster do not conflict with the broadcasting area of the other broadcaster or of the distribution platform.

The U.S. Patent Publication No. 2002/0154777 A1 to Sony Corporation discloses a satellite receiver comprising a GPS receiver configured for determining the position of said receiver, and a conditional access module configured for allowing or blocking, on the basis of the position determined by said GPS receiver, the access to a received content. One of the limits of this receiver is that the GPS does not properly work indoor, especially within reinforced concrete buildings or stone buildings. This makes difficult to control the content access. Moreover, the protection offered by this receiver can be simply eluded by generating a fake GPS signal by means of a properly configured transmitter. In this way, it is possible to access to the protected contents outside the authorized distribution area.

In addition, the solution to provide the satellite receiver with a GPS device can increase substantially the price of the receiver, especially in the case of Set Top Boxes.

There are no known solutions in the prior art that solve the technical problems described above.

SUMMARY OF THE INVENTION

It is therefore the aim of the present invention to provide a receiver apparatus for controlling the access to at least a portion of a content broadcasted via satellite received by said receiver apparatus in order to allow or block, on the basis of the position of said receiver, the access to said portion of the content broadcasted via satellite.

It is also an aim of the present invention to provide a method for controlling the access to at least a portion of a broadcasted signal content received by said receiver apparatus in order to allow or block, on the basis of the position of said receiver, the access to said portion of the content broadcasted via satellite.

These and other aims of the invention are achieved with a receiver apparatus comprising terrestrial communication means configured for receiving data which are used for determining access information, and wherein said receiver apparatus is configured for receiving at least a broadcast signals, preferably a satellite broadcast signal, and for allowing or blocking, on the basis of at least said access information, the access of the content of said broadcast signal, as claimed in the appended claims which form an integral part of the present description.

The invention is particularly interesting for controlling the access to contents broadcasted by satellite in border areas (e.g., close to the Italian-French border), where, due to the possibility to receive broadcast signals from two or more countries, it is necessary to control the access to contents in order to avoid infringing distribution contracts.

Further characteristics of the invention are object of the appended claims which are considered an integral part of the present description.

BRIEF DESCRIPTION OF THE DRAWINGS

These characteristics and other advantages of the present invention will become apparent from the description of an embodiment illustrated in the appended drawings, provided purely by way of non limiting example, in which.

DETAILED DESCRIPTION OF THE PREFERRED EMBODIMENTS

Figure 1:
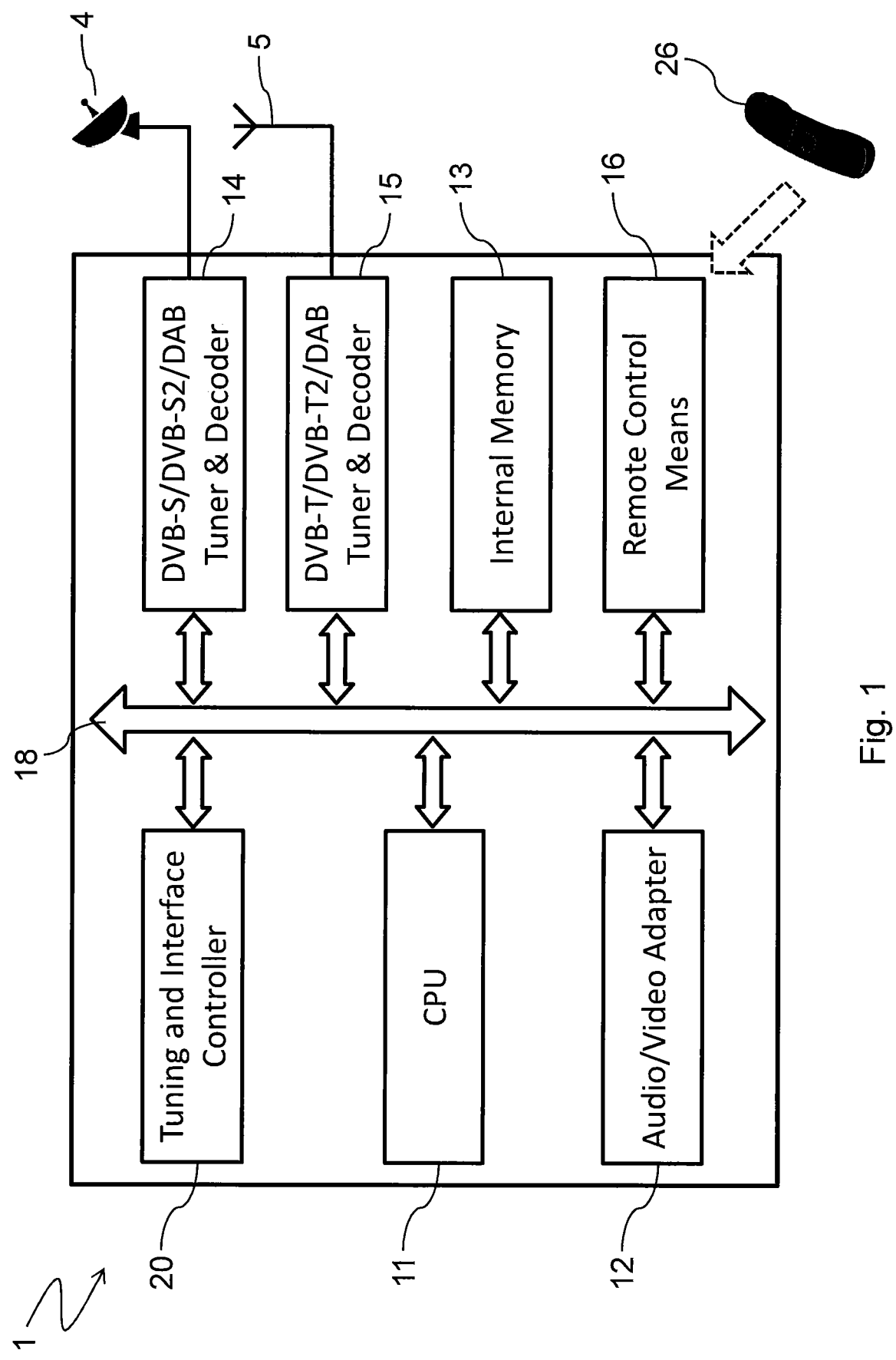
FIG. 1 illustrates a substantial part of a receiver apparatus according to the invention.

With reference to FIG. 1, a receiver apparatus 1 of radio and/or television signals (hereinafter identified only with the term 'signals') is shown.

Such receiver 1 comprises memory means 13 in which are stored the geographic transmission information relating to services that transmit said signals. This information includes a plurality of elements, where each element includes data which allows to identify a geographic location of a particular terrestrial television service that includes certain content. It should be noted that the term 'content' indicates a television/radio service, e.g., called 'service' in accordance with the terminology of the DVB standards, whereas in the terminology of the MPEG standards the same is referred to as 'program'.

Each content is identified by a name which is formed by a string of characters, wherein said character string is preferably equal to the name of the service transmitted using the DVB standard or the name of the radio station transmitted using the RDS or DAB standard.

The various data comprised in the geographical transmission information are structured so that the location of a certain service can be identified according to one or more of the following informational items: name of the service/broadcaster, the multiplex frequency, the multiplex identifier or the like. The structure of geographic transmission information will be described in more detail later in the following description.

The receiver 1 also includes the following elements:
- a central computing unit 11, also briefly indicated with the symbol CPU and/or with the term 'processing means';
- a audio/video controller 12 that comprises an audio playback unit (e.g., audio output interface) configured to generate an audio stream and/or a graphics processing unit (Graphics Processing Unit—GPU) configured to generate a video stream, wherein said audio/video stream is associated with a certain service and wherein said video stream is suitable to be displayed on an LCD panel and/or a plasma panel and/or a video projector and/or an external monitor to the receiver 1;
- memory means 13 containing, in addition to the above mentioned geographical information, the necessary instructions for the computing unit 11 to perform the steps of the method according to the invention, which will be better described in the course of this description;
- a tuning and interface controller 20 that allows for controlling and managing the operation of one or more tuners contained in said receiver 1;
- a communication bus 18 that allows the exchange of information between the central computing unit 11, the audio/video controller 12, the memory means 13, the tuning and interface controller 20 and the rest of the components contained in said receiver 1;
- remote control means 16 which allow the receiver 1 to receive commands from a remote control 26 and/or from another man-machine interface.

The memory means 13 may be of the ROM type (Read Only Memory) within which the programs (software) are written to be executed, or of the EPROM type (Erasable Programmable Read Only Memory), for instance of the re-writable type, apart from a memory RAM (Random Access Memory) in which the data elaborated by the CPU are momentarily written, or other similar type.

The receiver apparatus 1 may be a regular TV or a Smart-TV or a digital video recorder (Digital/Personal Video Recorder—DVR/PVR) or a set top box or other similar receiver or a radio receiver.

Moreover, the receiver 1 comprises means for receiving broadcast signals preferably comprising at least one tuner and decoder for digital satellite television/radio 14, preferably according to the standard DVB-S and/or DVB-S2 and/or DAB (via satellite) or the like, connected to an antenna 4 for the reception of satellite television/radio signal.

In addition to that, the receiver comprises means for receiving terrestrial signals preferably comprising at least one tuner and decoder for digital terrestrial television and/or radio 15, preferably according to the standard DVB-T and/or DVB-T2 and/or terrestrial DAB or the like, connected to an antenna 5 for the reception of terrestrial television signal.

The main embodiment will now be described, wherein the means for receiving broadcast signals comprise a tuner and decoder for digital satellite television and/or DAB satellite radio 15, whereas the means for receiving terrestrial signal comprise a tuner and decoder for digital terrestrial television and/or DAB terrestrial radio 14.

When the receiver 1 is in a state of initialization or installation for its first operation, the central computing unit 11 executes a set of instructions that configure, preferably through the tuning and interface controller 20, the digital terrestrial television tuner and decoder 15 to perform a scan of all the frequency bands in which television and/or radio transmissions can be present. During the scan, the central computing unit 11 is also configured to store in the memory means 13 the tuning information relative to each receivable service in the area where the receiver is located 1.

The tuning information allows for configuring, preferably by means of the tuning and interface controller 20, the receiving means (in this case the tuner and decoder 15) for the reception of the contents included in the received radio/television signals; for each receivable content, such tuning information includes, inter alia, the channel frequency containing the multiplex within which the desired service is comprised.

When the receiver apparatus 1 is in an operating condition, the central computing unit 11 of the receiver 1 according to the invention is configured to estimate the location of the receiver 1 using at least both the tuning information (obtained when the receiver 1 is in the initialization-installation condition) and the geographical transmission information relating to the services of the received signals, preferably by executing a set of instructions specifically designed for estimating the location.

In this way it is possible to estimate the location of the receiver 1, without advantageously employing locating means such making use of the GPS or GLONASS systems.

A description will now be made, by way of example, of how the receiver can estimate its location and what information it uses to do so. In this example, it is assumed that the receiver 1 has stored in its memory means 13 the geographic transmission information of the table below, in the case of services available in Italy:

| Content_ID | Zone |
| --- | --- |
| 4rete | Piedmont |
| Toscana TV | Tuscany |
| Primocanale | Liguria |
| Telegenova | Liguria |

It should be noted that the column "Zone" contains, for each of the contents (not the ones received through the means for receiving broadcast signals 14), a literal description, preferably in the form of a string, of the area in which said content can be received (the so-called coverage area), each content is identified by a string in the column "Content ID" which is the name of the service according to the DVB standard.

In addition, it is also assumed that the receiver 1, after having made such an automatic scan through the tuner and decoder 15, has stored, preferably in the memory means 13, the tuning information in the following table

| Content_ID | Frequency (MHz) |
| --- | --- |
| Rai 1 | 674,000 |
| Rai 2 | 674,000 |
| Rai 3 | 674,000 |
| Primocanale | 658,000 |
| Telegenova | 623.250 |
| Toscana TV | 586,000 |

To determine its location, the receiver 1 can for example select the lines of geographic transmission information, memorized in said memory means 13 that are compatible with the detected tuning information. In this way, the receiver 1 is able to determine its location by selecting the area that has the largest number of geographic information compatible with the tuning information.

If the tuning information and the geographic transmission information are stored in a relational database containing two relations (GeoInfo and TuningInfo) that are structured as the tables above, the receiver can determine its location 1 by performing the operation as just described by way of running the following SQL query:

```
SELECT TOP 1 tmp.Zone
FROM ( SELECT count (*) AS num_received_channels, ti.Zone
    FROM GeoInfo AS gi, TuningInfo AS ti
    WHERE gi.Content_ID = ti.Content_ID
    GROUP BY ti.Zone ) AS tmp
ORDER BY tmp.num_received_channels DESC;
```

The execution of this query, using the information from the tables above, would result in the string 'Liguria', from which is possible to determine that the receiver apparatus 1 is located in Italy, in particular in the Liguria region. In this way, it is possible to determine the access information, which preferably comprises the location information of receiver apparatus 1.

At this point it possible to configure the receiver to allow or block, on the basis of the said access information, the access to at least one of the contents received through the means for receiving broadcast signals (i.e., the tuner and decoder 14).

In order to block the access to a particular content, the processing means 11 can execute instructions for deleting the information for configuring (e.g., tuning) the tuner and decoder 14 to receive said content.

Alternatively or in combination with that what has just been described, the processing means 11 can execute instructions for preventing that the tuner and decoder 14 to decode said content and/or for configuring the audio/video controller 12 to produce a black screen output or an audio/video message informing the user of the receiver apparatus 1 that it is not possible to access to said content from the current location of said apparatus 1.

Alternatively or in combination with that what has just been described, the processing means 11 can execute instructions for disabling a control access module (not shown in the attached figures) to avoid that said content can be decoded.

It is, however, possible for the person skilled in the art to use a different approach for allowing or blocking, on the basis of the geographical position of the receiver apparatus 1, the access to a particular content, without, however, departing from the teachings of the present invention.

The accuracy in determining the location can be advantageously increased by adding to the tuning information the geographical information relative to the transmitter that uses the frequency (of the multiplex) from which a certain content is received. This also allows for taking advantage of national wide broadcasters that transmit content of local/regional interest.

In fact, this type of broadcaster are not always able to transmit in DVB-T using the isofrequency technique (SFN—Single-Frequency Network), but, in order to avoid problems in areas of overlap of the transmitted signal by two or more repeaters, they are obliged to transmit using the multi-frequency technique (MFN—Multi-Frequency Network). It therefore results in being possible to also advantageously exploit the information relating to the transmission frequencies so as to improve the accuracy of locating the receiver 1; such precision can be further increased by using the combination of the frequencies with the geographic transmission information that, for each content, also includes the geographic location of the transmitter which transmits said content.

Below are some of the contents (not the ones received through the means for receiving broadcast signals 14) of local/regional interest broadcast by national television broadcasters in Europe via digital terrestrial television, which can be exploited in order to help increase the accuracy in estimating the receiver's location 1:

- the TGR broadcast by RAI on RAI 3 in all twenty Italian regions;
- the local news broadcast on NDR Fernsehen in the four areas of NDR in Germany;
- regional programs broadcast on France 3 in France by France Televisions;
- the news program Telenoticies comarques broadcast by Televisio de Catalunya in the four Catalan provinces of Spain;
- programs broadcast on BBC ONE by the BBC in England.

In the example below, the geographical transmission information also includes, for each content, the channel frequency where the multiplex is placed and the geographical location of the transmitter of the content.

In order to illustrate this embodiment of the invention, it is assumed that the receiver 1 contains in its memory means 13, the geographical transmission information in the following table:

| Content_ID | Frequency (MHz) | Transmitter_Location | Zone |
|---|---|---|---|
| Rai 1 | 482,000 | Turin | Piedmont |
| Rai 2 | 482,000 | Turin | Piedmont |
| Rai 3 | 482,000 | Turin | Piedmont |
| Rai 1 | 674,000 | Genoa | Liguria |
| Rai 2 | 674,000 | Genoa | Liguria |
| Rai 3 | 674,000 | Genoa | Liguria |
| 4rete | 498,000 | Turin | Piedmont |
| Toscana TV | 586,000 | Massa Carrara | Tuscany |
| Primocanale | 658,000 | Genoa | Liguria |
| Telegenova | 538,000 | Genoa | Liguria |

It should be noted that the column "Transmitter Location" may also contain, rather than the literal description of the location, a pair of values that represent the geographic coordinates (latitude, longitude) relative to the location of the transmitter, in this way it is possible to increase the positioning precision of the system by making possible to allow or block the access to contents in one or more specific metropolitan areas. This can be particularly interesting for distributing, within a specific district, a sport event (e.g., a football match) involving athletes and/or teams coming from said district. In addition, it is also assumed that the receiver 1, after scanning by way of the tuner and decoder 15, has stored, preferably in the memory means 13, the tuning information in the following table:

| Content_ID | Frequency (MHz) |
|---|---|
| Rai 1 | 674,000 |
| Rai 2 | 674,000 |
| Rai 3 | 674,000 |
| Primocanale | 658,000 |
| Telegenova | 623,250 |
| Toscana TV | 586,000 |

As with the previous example, the receiver determines its geographical location by selecting the rows of geographic transmission information that are compatible with the detected tuning information. After that, the receiver 1 can group together the selected geographical information on the basis of the area or location. In this way, the receiver 1 is able to determine its geographical location by selecting the area or the location which has the largest number of geographic information compatible with the tuning information generated by the receiver 1 itself.

If the tuning information and the geographic transmission information are stored in a relational database containing two relations (GeoInfo and TuningInfo) that are structured as per the tables above, the receiver 1 can determine its geographical location by carrying out the operation just described above by running the following SQL query:

```
SELECT TOP 1 tmp.Zone
FROM ( SELECT count (*) AS num_received_channels,
    ti.Transmitter_Location
    FROM GeoInfo AS gi, TuningInfo AS ti
    WHERE gi.Content_ID = ti.Content_ID AND
        gi.Frequency = ti.Frequency
    GROUP BY ti.Transmitter_Location ) AS tmp
ORDER BY tmp.num_received_channels DESC;
```

The execution of this query, using the information in the above tables, would result in the string 'Genoa', thus allowing to determine the geographical location of receiver 1 with greater accuracy than the previous example.

At this point, the receiver apparatus 1 can allow or block the access to the content received through the means for receiving broadcast signals 14 according to the determined location.

It is, however, possible for the person skilled in the art to determine the location of the receiver 1 by using a strategy that uses the tuning information and the geographical transmission information in a manner different from that just described above, without, however, departing from the teachings of the present invention.

More in general, a requirement for determining the location of the receiver 1, using the strategy described above, is that the tuning information should be comparable with the geographical transmission information, namely it should be possible to understand, by example comparing, in some way, one or more of the respective fields of information, which elements of geographical transmission information corresponds to certain elements of tuning information generated/inserted by/in the receiver 1.

Once the geographical location of the receiver 1 has been estimated, it is possible to allow or block access to content based on said location.

An example of blocking access to content (received through the means for receiving broadcast signals 14) is the elimination of tuning information that allows access to a content which cannot be distributed in the area where the receiver 1 is located.

As an alternative to the elimination of the tuning information as mentioned above, it is possible to organize the information so as that the contents are not immediately accessible to the user, for example by making it possible to access the said tuning information, which is related to the content not relevant to the area where the receiver 1 is located, only through a secondary service list. In this way, in the primary service list only the content would be present that transmit information of local interest and/or information that can be distributed in the area where the receiver 1 is located.

The geographic transmission information has a very important role in ensuring a correct access to the contents received by the means for receiving broadcast signals 14. For this purpose, such geographical transmission information can be updated via radio, for example periodically tuning the tuner and decoder 14 to a particular service on which such information are transmitted (for example, using the MHP or another data transmission system associated to the television service). Alternatively or in combination to the solution just described, such geographical information can be received and, therefore updated through a data network accessible by means of a network interface (not illustrated in the attached figures), for example periodically accessing a web service (Web Service) that provides this information in a binary format readily usable by the receiver 1.

In summary, the receiver apparatus 1 performs a method for controlling the access to the content included in the radio and/or television signals received by said receiver 1, wherein said method comprises the following steps:

a. generate the tuning information relating to received terrestrial broadcasted radio and/or television signals;

b. determine the access information, which preferably comprises the geographical location of the receiver 1, according to the tuning information generated in the course of step a. and/or the geographic transmission information that includes the geographic locations of transmitters that transmit signals that are received by the receiver 1;

c. controlling, on the basis of the access information generated during step b., the access to the content received through the means for receiving broadcast signals 14 in order to allow or block access to said content regarding the location of the receiver 1.

To make possible the implementation of the method according to the invention by the receiver of radio and/or television signals 1, said method can be encoded in a computer program using a programming language, such as C/C++, C #, Visual Basic, Fortran or similar. This program can be preloaded into the memory of the receiver 1; alternatively, this program can be preferably an App, and can be downloaded by the receiver 1, preferably on a specific user request, through a data network (e.g., Internet or the like).

As a total or partial alternative for the implementation by software, part of the method may be performed by specially developed circuitry and/or programmable hardware, for example a CPLD, FPGA or the like.

Figure 2:
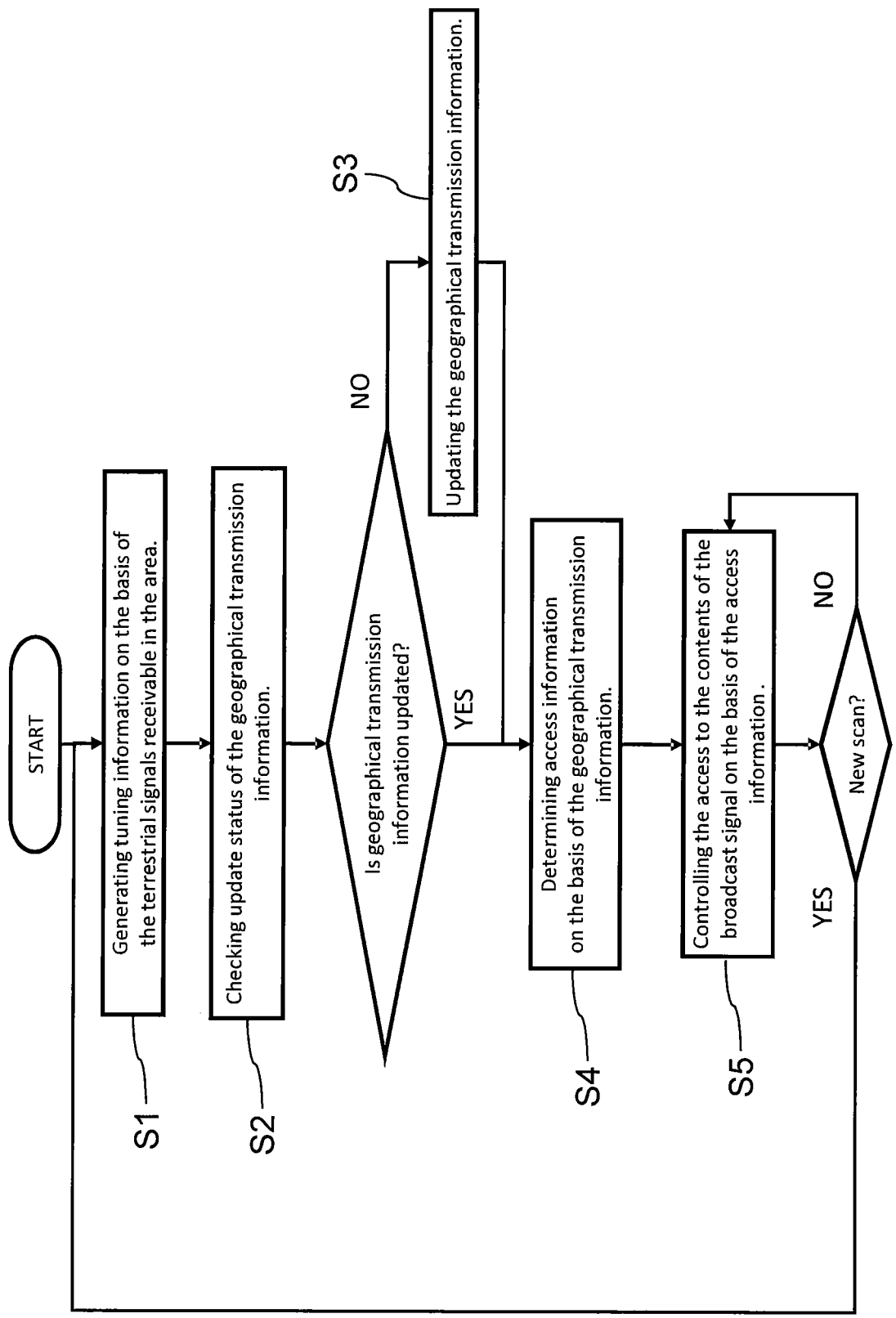
FIG. 2 illustrates a flow diagram of an implementation of a method according to the invention used by the receiver apparatus of FIG. 1.

Also with reference to FIG. 2, an implementation of the method described above and applied to the receiver 1 comprises the following states:

- a search state of the received signals S1, during which the receiver 1 operates step a. of the method according to the invention, allowing the receiver apparatus 1 the generation of the tuning information on the basis of the terrestrial signals receivable in the area in which the receiver 1 is located;
- a geographic information verification state S2, during which the receiver first checks the update status of the geographical transmission information;
- a geographic information update state S3, during which the receiver 1 updates the geographic transmission information;
- a location determination state S4, during which the receiver 1 generates access information by operating step b. of the method according to the invention, allowing the receiver apparatus 1 to determine (or estimate) its current geographic location by using the tuning information, which is generated during the permanence of the receiver in state 51, and to geographical transmission information, which is verified and updated as required during the permanence of receiver 1 in the states S2 and S3;
- an access content preparation state S5, during which the receiver 1 operates step c. of the method according to the invention, by allowing or blocking, on the basis of the access information determined during the permanence of the receiver 1 in the state S4, the access to content received through the means for receiving broadcast signal.

When the receiver enters a state of initialization/installation (for example, when the search for services is initiated or the receiver 1 is turned on for the first time), the method described above is performed and the receiver apparatus 1 enters state 51.

During its permanence in this state 51, the receiver 1 generates tuning information, for example by using the automatic scanning feature that is present today in the majority of radio and television receivers, the receiver apparatus 1 then switches to S2.

During its permanence in state S2, the receiver 1 checks whether the geographic transmission information is updated, for example by calculating a summary (hash) of the transmission information present in the memory means 13 and by comparing the computed hash with the one published by a web service or by means of a radio service update, where said service is responsible for the transmission of updated geographic transmission information. If the information is not updated, the receiver apparatus 1 enters state S3, otherwise the receiver apparatus 1 enters state S4.

During its permanence in state S3, the receiver 1 downloads from a network, to which it is connected by way of the network interface, updated geographic transmission information and proceeds to update the information already present in the memory means 13. Alternatively, or in combination with what has just been described, the receiver 1 may update such information waiting for a more recently updated version of the radio service to be transmitted. After updating the geographic transmission information, the receiver enters state S4.

During its permanence in state S4, the receiver 1 determines its geographical location by running step b. of the method according to the invention, after which the receiver 1 enters state S5.

During its permanence in state S5, the receiver 1 allows or blocks, on the basis of the geographical location determined in the state S4, the access to at least one of the contents included in the broadcast signals received through the means for receiving broadcast signals 14, preferably allowing the access to the contents that can be distributed in a predetermined area (e.g., a country, a region, etc.) in which the receiver 1 is located.

The receiver remains in state S5 until a new scan of the terrestrial signal is requested, e.g., by an user request made through the remote controller 26, for example after the receiver 1 has performed the automatic search of available content in a specific area, or by the processing means 11 configured for making a new scan request at the end of a predetermined time period (e.g., 1 day).

When a new scan request is made, the receiver apparatus 1 enters again in state S1, and a new execution cycle of the method according to the invention begins.

Alternatively or in combination with what has just been described, the means for receiving terrestrial signal can comprise a wireless network adapter, preferably complying with one or more of IEEE 802.11 specifications, and/or a mobile modem, preferably complying with one or more of GPRS/EDGE/UMTS/LTE standards, for accessing to a data network through which it is possible to receive signals (e.g., cell broadcast messages or the like) that can be used by the receiver apparatus 1 for determining/estimating its own geographical position.

Figure 3:
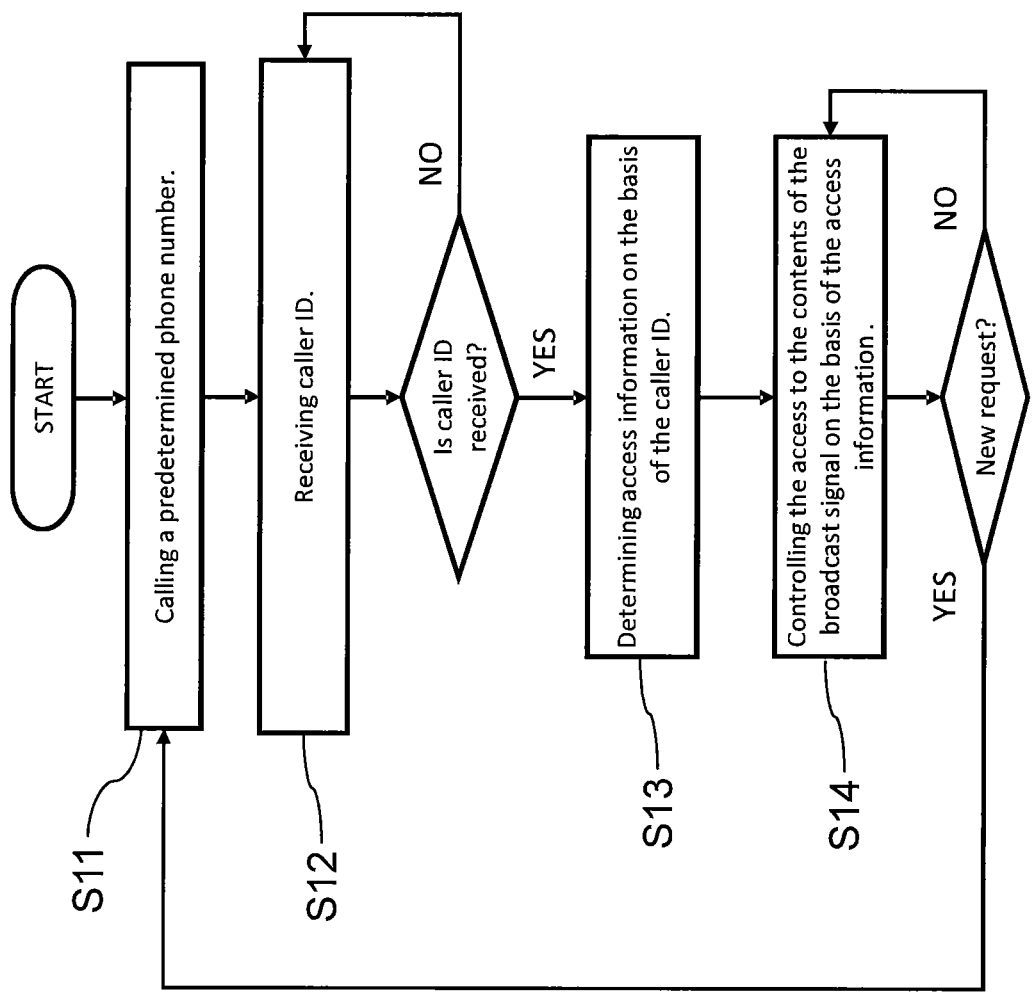
FIG. 3 illustrates a flow diagram of an implementation of a first variant of a method according to the invention used by a variant of the receiver of FIG. 1.

Also with reference to FIG. 3, a variant of the above-described receiver apparatus 1 and of the previously described method will now be described. The receiver apparatus according to this variant is similar to the receiver apparatus 1 of the previous embodiment, but estimates its own geographical position in a different way, i.e., without generating tuning information (step a. of the previously described method) and without using said tuning information for determining the position of the receiver (step b. of the previously described method).

The means for receiving terrestrial signal of the receiver apparatus according to this variant comprises a landline modem, preferably complying with ITU-T V.92 recommendation or the like, which can be used for calling an identification server (not shown in the attached drawings).

The identification server is configured for performing the following steps:

- determining the phone number (e.g., by reading the caller id message) of the incoming call made by the receiver apparatus by means of the landline modem;
- accepting the phone call made by the receiver apparatus by means of the landline modem;

transmitting to the receiver apparatus the determined phone number through the connection established through the landline.

After that the receiver apparatus has received the phone number associated to the phone line to which it is connected, said receiver apparatus is able to determine/estimate its own geographical position by comparing the international code and/or the area code of the phone number received (the caller id) with phone numbering information, wherein said phone numbering information associates to each country/area code a specific location (e.g., a country, a region, a city, etc.) by making possible to determine/estimate the geographical position of said receiver apparatus.

The operation of the receiver that executes the method according to the present embodiment can be outlined by the following states:
- a dial state S11, during which the receiver apparatus dials, by means of the landline modem, the phone number of the identification server;
- a number receive state S12, during which the receiver apparatus receives through the landline the phone number determined by the identification server, i.e., the caller ID;
- a location determination state S13, during which the receiver generates access information by determining (or estimating) its current geographic location on the basis of the caller ID and the phone numbering information;
- an access content preparation state S14, during which the receiver 1 allows or blocks, on the basis of the access information determined during the permanence of the receiver 1 in state S13, the access to content received through the means for receiving broadcast signal.

When the receiver enters a state of initialization/installation (for example, when the search for services is initiated or the receiver apparatus is turned on for the first time), the method described above is performed and the receiver apparatus enters state S11.

During its permanence in this state S11, the receiver dials, by means of the landline modem, the phone number of the identification server and tries to establish a connection with said identification server, the receiver apparatus then switches to S12.

During its permanence in state S12, the receiver waits to receive from the identification server the caller ID determined by said server.

If the receiver apparatus has received the whole caller ID, the receiver apparatus enters state S13, otherwise the receiver apparatus remains in state S12 for completing the reception of the caller ID.

During its permanence in state S13, the receiver 1 determines its location on the basis of the caller ID and the phone numbering information, preferably by comparing part of the symbols included in the caller ID with said phone numbering information; after that, the receiver enters state S14.

During its permanence in state S14, the receiver 1 allows or blocks, on the basis of the location determined in the state S13, the access to at least one of the contents included in the broadcast signals received through the means for receiving broadcast signals 14, preferably allowing the access to the contents that can be distributed in a predetermined area (e.g., a country, a region, etc.) in which the receiver is located.

The receiver remains in state S14 until a new initialization of the receiver apparatus is requested, e.g., by an user request made through the remote controller 26 or by the processing means 11 configured for making a new initialization request at the end of a predetermined time period (e.g., one month).

When a new scan request is made, the receiver apparatus enters again in state S11, and a new execution cycle of the method according to the invention begins.

Figure 4:
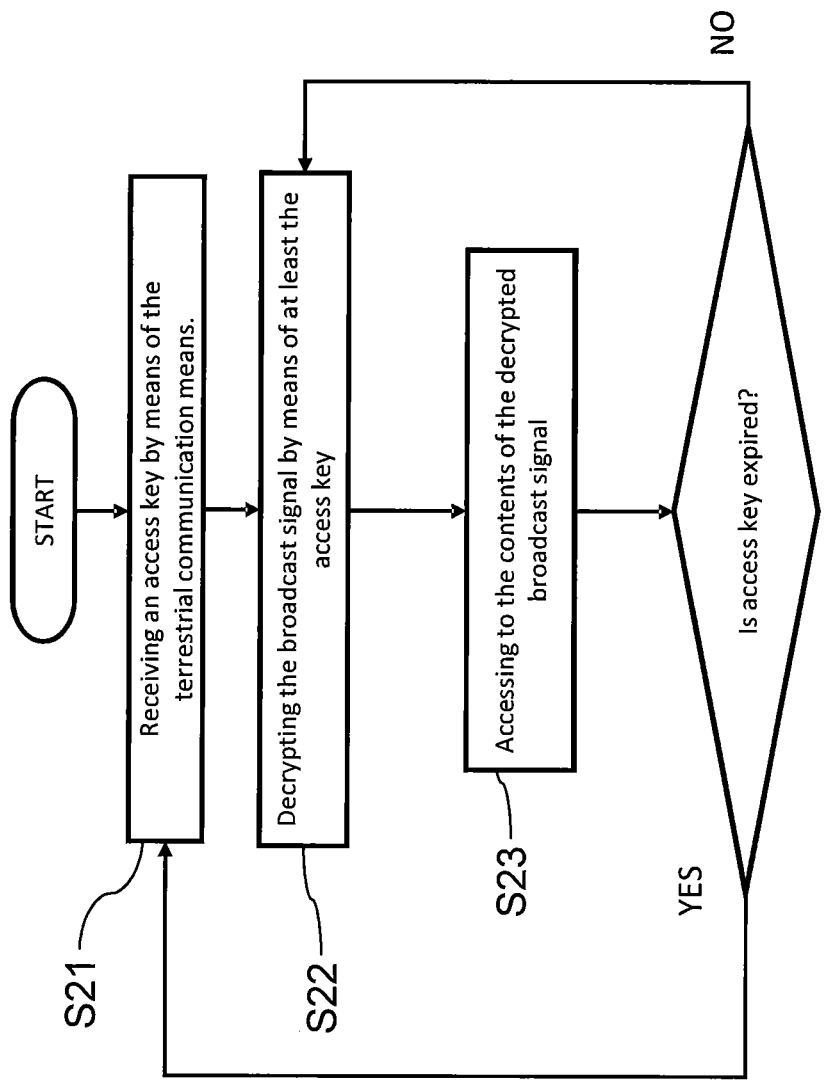
FIG. 4 illustrates a flow diagram of an implementation of a second variant a method according to the invention used by a variant of the receiver of FIG. 1.

Also with reference to FIG. 4, another variant of the receiver apparatuses of the previous embodiments and of the previously described methods will now be described. The receiver apparatus according to this variant is similar to the receiver apparatus of the previous embodiment, but does not estimate itself its own position based on the tuning information, i.e., does not perform the step a. and b. of the method according to the main embodiment.

This receiver does not determine the access information on the basis of "local information" (for example the tuning information or the phone number associated to a landline to which the receiver apparatus is connected), but receives said access information through the means for receiving terrestrial signals. More in details, the access information comprises at least an access key, preferably valid for a limited amount of time (e.g., 10-20 seconds), which can be used for decrypting the signal received through the means for receiving broadcast signal 14. Therefore, if the receiver apparatus is able to receive said access key or a sequence of said keys, it will be able to decrypt the signal properly, allowing the access to the content(s) of said signal; otherwise, said receiver apparatus will be unable to decrypt said signal properly, effectively blocking access to the content(s) of the signal.

In this way, it is possible to control the access to at least a content of a signal by encrypting said signal with an access key, preferably by means of a symmetric cryptography algorithm, and distributing said key by means of a terrestrial communication network, preferably a DVB-T/DVB-T2 network, within the area of interest in which said content can be distributed.

This allows a broadcaster to distribute contents by means a satellite distribution network without infringing any distribution contracts providing restrictions on the area of distribution or the like.

In this way, the broadcaster can simplify its own distribution network.

Summarizing, a content distribution system based on the present embodiment of the invention comprises the following parts:
- a receiver apparatus according to the present embodiment;
- a ground station transmitting the terrestrial signal that comprises at least one access key;
- a broadcast station transmitting the broadcast signal, wherein said broadcast signal is encrypted in a way that at least a portion of said broadcast signal can be decrypted by means of at least said at least one access key.

The operation of the receiver that executes the method according to the present embodiment can be outlined by the following states:
- a key reception state S21, during which the receiver apparatus receives, by means of the means for receiving terrestrial signals 15, at least one access key;
- a decryption state S22, during which the receiver apparatus decrypts the broadcast signal, which has been received through the means for receiving broadcast signals, by means of at least the access key received during the permanence of the receiver 1 in state S21;
- a content access state S23, during which the receiver 1 accesses to the content(s) of the signal decrypted during the permanence of the receiver 1 in the state S22, preferably by decoding the content(s) comprised in said decrypted signal.

When the receiver apparatus is a working condition (for example, when a particular satellite program/content is selected by the user of said receiver apparatus), the method described above is performed and the receiver apparatus 1 enters state S21. During its permanence in this state S21, the receiver receives, by means of the means for receiving terrestrial signals 15, at least one access key, the receiver apparatus then switches to S22.

During its permanence in state S22, the receiver decrypts or tries to decrypt the broadcast signal, which has been received through the means for receiving broadcast signals, by means of at least said at least one access. After that, the receiver enters in state S23, and provides or tries to provide access to the decrypted content. The receiver apparatus remain in the state S23 until the access key is expired, i.e., it is no more valid. After the access key is expired, the receiver apparatus enters again in state S21, and a new execution cycle of the method according to the present embodiment begins.

It should be noted that each embodiment can be combined with one or more of the other embodiments in order improve the protection provided by the receiver apparatus and by the method according to the present invention to the content producers.

Numerous other variants are therefore possible, without departing from the principles of novelty inherent in the inventive idea. It is clear to the expert that, in the practical implementation, the forms of the illustrated details may be different and that they can be replaced with technically equivalent elements. It is therefore easily understood that the present invention is not limited to the illustrative examples described, but is susceptible to various modifications, improvements, substitution of parts and equivalent elements without departing from the basic inventive idea, as specified in the following claims.

The invention claimed is:

1. A receiver apparatus for controlling access to at least a portion of a content broadcasted via satellite, comprising:
   means for receiving broadcast signals configured for receiving at least a broadcast signal comprising at least a content,
   means for receiving terrestrial signals configured for receiving at least a terrestrial signal, further comprising processing means configured for:
   determining access information on a basis of at least said received terrestrial signal, and
   allowing or blocking, on a basis of at least said access information, access to said at least one content of said broadcast signal,
   wherein the access information comprises at least an access key, and
   wherein the processing means are also configured for decrypting the broadcast signal by means of at least said at least one access key, said access key being valid for a limited amount of time and being distributed, by means of said at least terrestrial signal, within an area in which said content is distributed;
   wherein the access information comprises positional data representing a geographical location of said receiver apparatus, and wherein the processing means are configured for estimating said positional data on the basis of at least said received terrestrial signal;
   wherein the means for receiving terrestrial signals comprises at least one tuner and decoder for digital terrestrial television and/or radio which is configured for generating tuning information relative to receivable services in an area where said receiver apparatus is located, and wherein the processing means are configured for estimating the positional data on a basis of at least said tuning information and geographical transmission information;
   wherein the means for receiving terrestrial signals comprises a modem which can be connected to a landline, wherein said modem is configured for determining a phone number of the landline to which it can be connected, and wherein the processing means are configured for estimating said positional data on a basis of at least the phone number of said landline and phone numbering information.

2. A content distribution system, comprising:
   the receiver apparatus according to claim 1,
   a ground station transmitting the terrestrial signal that comprises said at least one access key, and
   a broadcast station transmitting the broadcast signal, wherein said broadcast signal is encrypted in a way that at least a portion of said broadcast signal can be decrypted by means of at least said at least one access key.

3. A method for controlling access to at least a portion of a content broadcasted via satellite, comprising the phases of:
   a. receiving, by means for receiving broadcast signals, at least a broadcast signal comprising at least a content,
   b. receiving, by means for receiving terrestrial signals, at least a terrestrial signal,
   c. determining, by processing means, access information on a basis of at least said received terrestrial signal,
   d. allowing or blocking, by the processing means, access to said at least one content of said broadcast signal on a basis of at least said access information,
   wherein the access information comprises at least an access key, and
   wherein said method also comprises at least a phase of decrypting the broadcast signal, by means of processing means, by using at least said at least one access key, said access key being valid for a limited amount of time and being distributed, by means of said at least terrestrial signal, within an area in which said content is distributed;
   wherein the access information comprises positional data representing a location in which the means for receiving broadcast signals have received said broadcast signal, and wherein, during the phase of determining access information, said positional data are estimated, by the processing means, on the basis of at least said terrestrial signal;
   wherein, during the phase of determining access information, tuning information, which is relative to receivable services in an area where said means for receiving broadcast signals are located, are generated by at least one tuner and decoder for digital terrestrial television and/or radio, and wherein said positional data are estimated, by the processing means, on a basis of at least said tuning information and geographical transmission information;
   wherein, during the phase of determining access information, tuning information, which is relative to receivable services in an area where said means for receiving broadcast signals are located, are generated by at least one tuner and decoder for digital terrestrial television and/or radio, and wherein said positional data are estimated, by the processing means, on a basis of at least said tuning information and geographical transmission information.

4. A computer program product loadable to a memory of a computer and comprising portions of software code for implementing the phases of the method according to claim 3.

5. The computer program product according to claim 4, wherein said software code is downloadable through a data network.

* * * * *